UNITED STATES PATENT OFFICE.

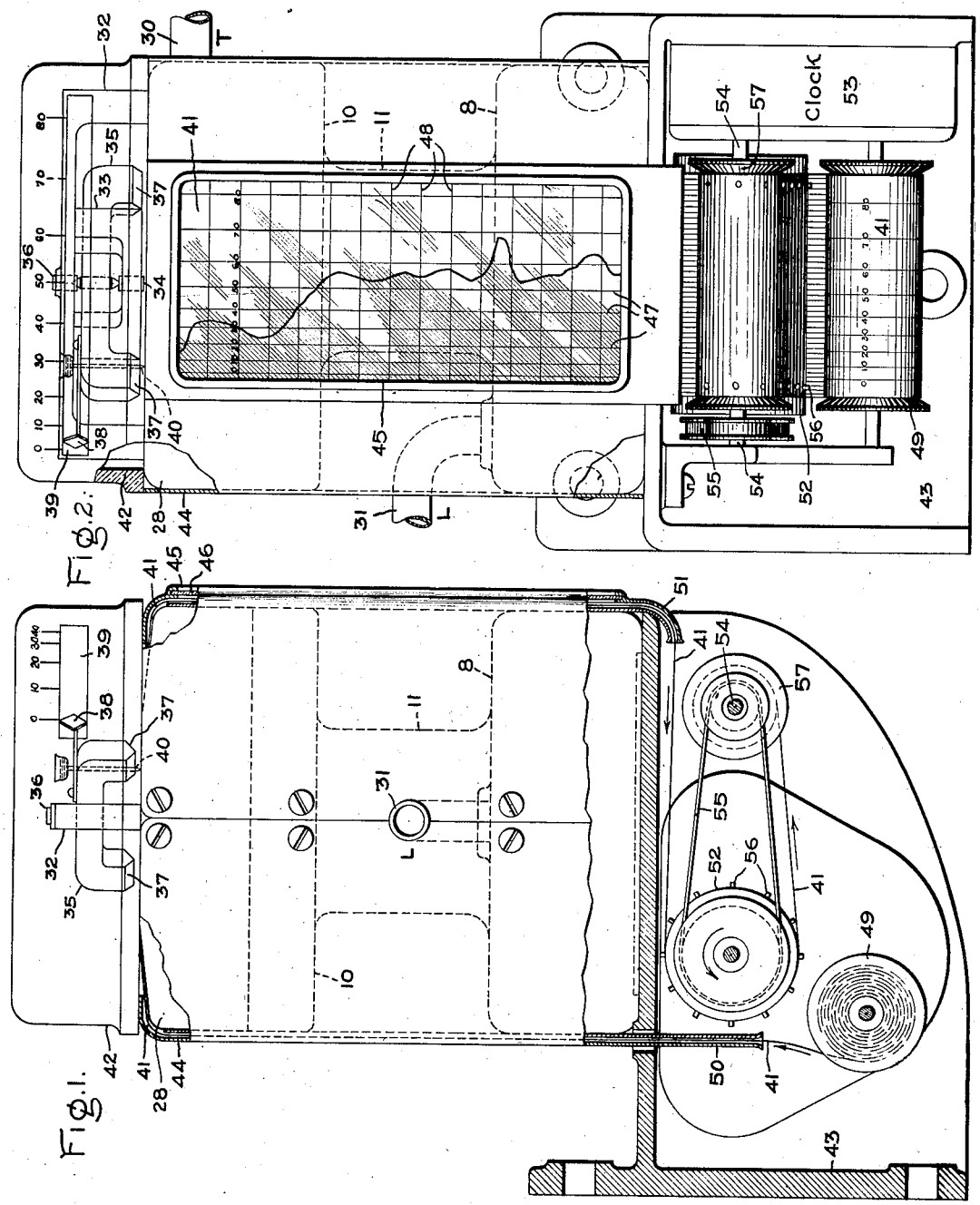

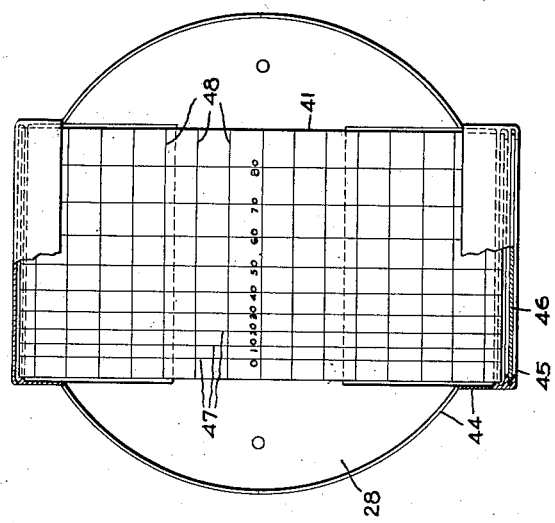
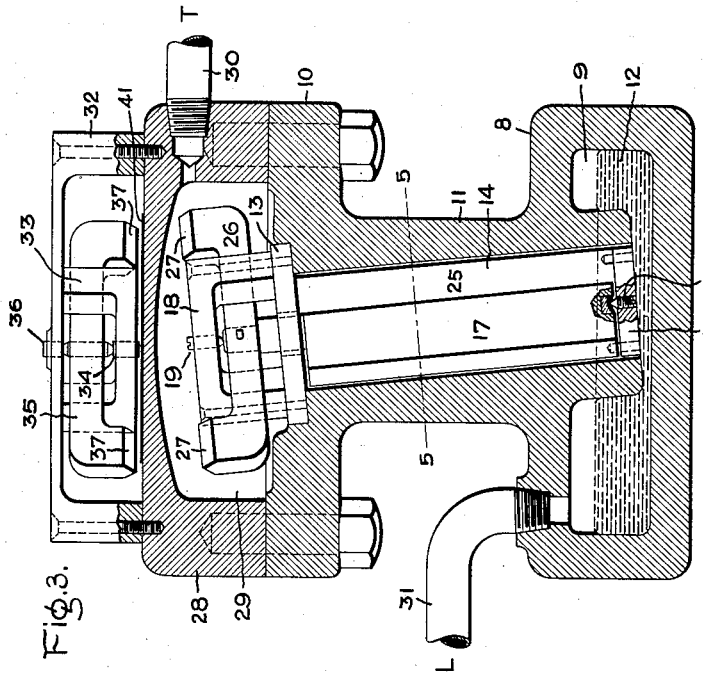
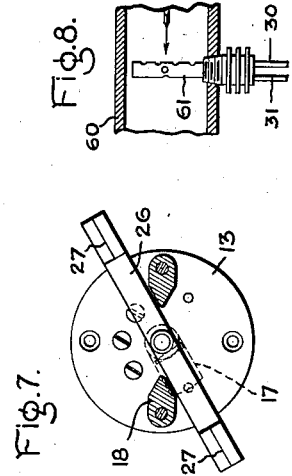
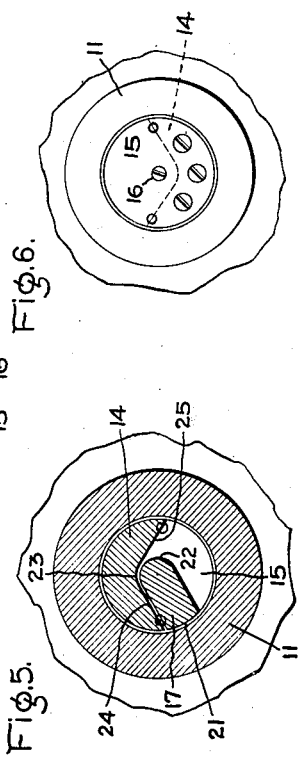
J. WILKINSON.
FLUID METER.
APPLICATION FILED FEB. 19, 1913.
1,105,051. Patented July 28, 1914.
2 SHEETS—SHEET 2.
Witnesses
Marcus L. Byng
J. Ellis Glen
Inventor
James Wilkinson
by Albert G. Davis
His Attorney

JAMES WILKINSON, OF BOSTON, MASSACHUSETTS, ASSIGNOR TO GENERAL ELECTRIC COMPANY, A CORPORATION OF NEW YORK.

FLUID-METER.

1,105,051. Specification of Letters Patent. Patented July 28, 1914.

Application filed February 19, 1913. Serial No. 749,371.

*To all whom it may concern:*

Be it known that I, JAMES WILKINSON, a citizen of the United States, residing at Boston, in the county of Suffolk, State of Massachusetts, have invented certain new and useful Improvements in Fluid-Meters, of which the following is a specification.

The present invention relates to fluid meters and more especially to those intended for elastic fluids such as air, gas or steam, and has for its object to provide a meter of improved construction which will indicate the rate of flow of fluid through a conduit and also record the same on a suitable chart.

For a consideration of what I believe to be novel and my invention, attention is directed to the accompanying description and claims appended thereto.

In the accompanying drawings which are illustrative of my invention, Figure 1 is a view in side elevation of the meter with certain of the parts broken away; Fig. 2 is a view in front elevation; Fig. 3 is a vertical sectional view of the movable element of the meter; Fig. 4 is a top plan view of the meter; Fig. 5 is a cross-sectional view of the float or movable member of the meter taken on line 5—5 of Fig. 3; Fig. 6 is a bottom plan of the lower bearing of the float or movable member; Fig. 7 is a top plan view of the magnet which moves the indicator or pointer together with its support; and Fig. 8 is a detail view of a device for creating a pressure difference that is responsive to changes in the rate of flow of fluid passing through a main.

Briefly stated, in carrying out my invention a means is connected to the main carrying the fluid to be metered which creates a pressure difference that is responsive to and varies with changes in the rate of flow of said fluid. This pressure difference is caused to act in a body of liquid contained in a receptacle in a manner to change the level thereof, said liquid in turn acting on a float which moves the indicating and recording mechanism.

Referring first to Fig. 3, 8 indicates the casing of the meter which comprises an enlarged base containing a mercury well or chamber 9 and a flanged upper end or head 10 that is connected to the base by a neck 11. This neck is provided with an inclined cylindrical chamber and extends into the well below the level of the mercury 12 or other fluid contained therein. As the level of the mercury or other fluid in the chamber varies due to changes in the rate of flow of the fluid being metered the movable member or float of the meter swings in one direction or the other as the case may be.

Mounted on the head 10, which is shouldered to receive it, is a holder comprising a head 13 and a downwardly extending arm or projection 14 that supports the disk 15, the latter carrying the lower bearing pin 16 for the inclined oscillating member or float 17. The lower bearing for the float is always submerged in the mercury. Extending across the head of the holder is an inverted U-shaped bridge piece 18 that carries the upper bearing pin 19 for the float. The holder and float are removable from above which is advantageous as it permits the parts to be taken down or assembled without removing the mercury or without danger of spilling it. The float comprises a relatively long narrow piece of metal of approximately rectangular cross-section. It should be relatively light and may be made hollow for the purpose or of some light material. It is somewhat oblique to the vertical and the amount of its inclination can best be determined by experiment in each case. It is desirable to make it as nearly vertical as possible to avoid errors due to a change in mercury level, but on the other hand, it must be inclined in order for the mercury to turn it. The outer face 21 of the float is curved in such manner as to cause it to conform closely to the inclined cylindrical wall of the neck. The inner face 22 is also curved but on a smaller radius to cause it to conform closely to the curved face 23 of the downwardly extending arm or projection 14, said curved face connecting the side portions or walls 24 and 25 of the projection and between which the float moves. The float at zero flow in the main to be metered occupies the position shown in Fig. 5 and as the flow increases swings about its inclined axis toward the wall 25. The upper end of the float is reduced in section and mounted thereon is a U-shaped permanent magnet 26 of generous size and power which has beveled faces 27 to concentrate the magnetic flux.

Mounted on the top of the base is a non-magnetic cover 28 that coöperates with the latter to form a chamber 29 in which the magnet is located. To this chamber is connected a pipe 30 that connects with the low pressure side of some device capable of producing a pressure difference that bears a definite relation to changes in the rate of flow of the fluid being metered. This may be a nozzle plug operating on the Pitot tube plan, a Venturi tube, or other equivalent device. The other or high pressure side of the nozzle plug, Venturi tube or other device is connected to the chamber 9 by the pipe 31. Under working conditions the higher pressure in the chamber 9 forces the mercury up into the bore of the neck by an amount depending upon the difference in pressure between the pipes 30 and 31 and this in turn is dependent upon the nozzle plug or other device responsive to changes in the rate of flow of the fluid being metered. Since the float cannot move longitudinally by reason of its fixed pivots but can only turn or oscillate about its axis, by reason of the inclination thereof, any change of the mercury level either up or down will turn the float in one direction or the other and with it the permanent magnet attached thereto.

Mounted on top of the cover 28 is a support 32 to which is attached a U-shaped bridge piece 33 carrying a bearing 34 for the lower end of the spindle of the permanent magnet 35. The upper bearing 36 of the spindle is carried by the support 32. The ends of the magnet are beveled at 37 to concentrate the magnetic flux so that said magnet will accurately follow the movements of the magnet 26. To the magnet 35 is attached a needle or pointer 38, Fig. 1, that moves in a horizontal plane back and forth over the scale plate 39 to indicate the rate of flow of the fluid being metered, said scale being suitably calibrated, as for example in pounds flow per unit of time for elastic fluids or in gallons per unit of time for liquids. In addition to the pointer the magnet 35 carries a pen 40 of any suitable construction which rests on a paper chart 41 that is driven by a motor mechanism such as a clock. Inclosing the parts of the meter just described is a glass cover 42 through which they may be observed.

The meter is carried by a bracket 43, Fig. 1, that is attached to any suitable support. Surrounding the meter is a thin sheet metal casing or covering 44 having an opening 45, Fig. 2, covered by glass 46 and through which the moving chart can be seen. The paper for the chart is suitably ruled with longitudinal lines 47 indicating units of flow, and with cross lines 48 indicating units of time. The chart is mounted on a reel 49 and passes upward through a narrow passage formed between two thin plates 50. From the upper end of the passage it extends across the top of the cover 28, Fig. 4, and thence down the front of the casing in back of the glass front to the guide formed of two thin curved plates 51. From this guide the chart passes to the sprocket wheel and drum 52 which is driven by a motor such as a clock 53 driving a spindle 54 through a belt 55. The chart is provided with perforations on its sides to receive the pins 56 on the wheel 52 to prevent slipping.

57 indicates a rewinding reel mounted on the spindle 54 and driven through any suitable form of device.

In Fig. 8 is shown a suitable means for creating a pressure difference that varies with changes in the rate of flow of the fluid being metered. 60 indicates the main and 61 a nozzle plug located therein which has leading orifices that face the moving column of fluid and are connected to the conduit 31 and one or more trailing orifices that are connected to the conduit 30.

It will be observed that the magnet 35 carries both the needle and the pen and moves them directly. This has the advantage of avoiding all lost motion and of being extremely simple and reliable in operation. By passing the paper chart over the top of the cover 28 a good firm support is provided therefor without the addition of other supporting means. It passes between the opposed faces of the magnets 26 and 35, but being non-magnetic has no effect thereon. Owing to the extreme thinness of the paper it does not appreciably increase the necessary clearance between the parts. By supporting the upper magnet in the manner illustrated, i. e. from above the cover 28, there is nothing to interfere with the free movements of the chart which may be as wide as necessary to include the range of movement of the pen. The arrangement also permits the use of a relatively wide chart and ample movement of the float so that a small change in the rate of flow will cause a substantial movement of the needle and pen. By locating the parts as described the station operator can tell at a glance what the momentary flow is and what the flow has been for a considerable period of time.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In a meter of the character described, the combination of a casing containing a body of fluid adapted to rise and fall with changes in pressure, a float having an axis oblique to the vertical, which turns as the level of the fluid changes, pivots for the float, a holder attached to the casing which extends below the float into the fluid and carries the lower pivot of the float, and a means for indicating the movements of the float.

2. In a meter of the character described, the combination of a closed casing having two chambers both adapted to contain a body of fluid which moves from one chamber to the other in response to pressure changes, a float adapted to be acted upon by the fluid contained in one of the chambers and which extends longitudinally thereof, the axis of said float being oblique to the vertical, pivots for the float that permit angular movements but prevent lengthwise movement thereof, a support for the lower pivot of the float that is partly submerged in the fluid, and means for communicating angular movements of the float to the outside of the casing.

3. In a meter of the character described, the combination of a closed casing containing a supply chamber or well and a float chamber, the latter extending obliquely to the former, a holder located in and partly filling the float chamber and which extends longitudinally thereof, a relatively long narrow float in the chamber which is pivotally supported by the holder and is moved as the fluid in one chamber moves into the other, the axis of the float being oblique to the vertical, and means for communicating angular movements of the float to the outside of the casing.

4. In a meter of the character described, the combination of a casing comprising a base containing a supply chamber or well and a neck containing a smaller chamber in communication with the well, a float in the smaller chamber whose axis is inclined to the vertical and which is moved by fluid passing from one chamber to the other, pivots for the float, a holder for the pivots carried by the base and located in the float chamber, a cover for the casing, and a magnetic transmission means, part of which is inside the cover and the remainder outside for causing movements of the float to be indicated outside of the casing.

5. In a meter of the character described, the combination of a casing containing a well and an inclined cylindrical chamber communicating therewith, a relatively long narrow float in the chamber, the outer face of which is concentric with the wall of the chamber, a holder that extends into the chamber and is supported at its upper end, pivots for the float carried by the holder, a magnet moved by the float, a non-magnetic cover therefor, a magnet outside the cover moved by the first, a conduit admitting fluid to the well, and a second conduit admitting fluid to the chamber.

6. In a meter of the character described, the combination of a casing containing a well and an inclined cylindrical chamber communicating therewith, a relatively long narrow float in the chamber, the outer face of which is concentric with the wall of the chamber, a holder that extends into the chamber and is supported at its upper end, pivots for the float carried by the holder, a magnet moved by the float, a non-magnetic cover therefor, a magnet outside the cover moved by the first magnet, a scale, a pointer carried by the second named magnet which moves over the scale, a conduit admitting fluid to the well, and a second conduit admitting fluid to the chamber.

7. In a meter of the character described, the combination of a casing containing a body of fluid adapted to rise and fall with changes in pressure differences, a float having an axis oblique to the vertical which float turns as the body of fluid rises and falls, a means supported by the top of the casing, one portion of which extends into the fluid, bearings for the float, one of which is supported by the upper end of said means and the other by said portion, magnetic means turning in response to movements of the float, and an indicator moved by said means.

In witness whereof, I have hereunto set my hand this seventeenth day of February, 1913.

JAMES WILKINSON.

Witnesses:
BERTHA A. LORD,
N. L. GANNON.